United States Patent
Imaizumi et al.

(10) Patent No.: US 11,158,875 B2
(45) Date of Patent: Oct. 26, 2021

(54) METHOD OF PRODUCTION OF CHANNEL MEMBER FOR FUEL CELL

(71) Applicant: FUTAMURA KAGAKU KABUSHIKI KAISHA, Nagoya (JP)

(72) Inventors: Takuzo Imaizumi, Aichi (JP); Naomi Goto, Aichi (JP); Naoki Shiba, Aichi (JP)

(73) Assignee: FUTAMURA KAGAKU KABUSHIKI KAISHA, Aichi (JP)

(*) Notice: Subject to any disclaimer, the term of this patent is extended or adjusted under 35 U.S.C. 154(b) by 225 days.

(21) Appl. No.: 16/572,399

(22) Filed: Sep. 16, 2019

(65) Prior Publication Data
US 2020/0014049 A1 Jan. 9, 2020

Related U.S. Application Data

(62) Division of application No. 15/521,443, filed as application No. PCT/JP2015/080932 on Nov. 2, 2015, now Pat. No. 10,431,839.

(30) Foreign Application Priority Data

Nov. 10, 2014 (JP) ................................ 2014-227989
Oct. 26, 2015 (JP) ................................ 2015-209859

(51) Int. Cl.
*H01M 8/1041* (2016.01)
*H01B 1/12* (2006.01)
(Continued)

(52) U.S. Cl.
CPC .......... *H01M 8/1055* (2013.01); *H01B 1/124* (2013.01); *H01M 8/0206* (2013.01);
(Continued)

(58) Field of Classification Search
CPC ............. H01M 8/0206; H01M 8/0221; H01M 8/0213; H01M 8/0228; H01M 8/0258; H01M 8/026
See application file for complete search history.

(56) References Cited

U.S. PATENT DOCUMENTS

2006/0054269 A1* 3/2006 Nishi .................. H01M 8/0234
156/73.6
2007/0128464 A1 6/2007 Jang
(Continued)

FOREIGN PATENT DOCUMENTS

JP 2000-285930 A 10/2000
JP 2003-217611 A 7/2003
(Continued)

OTHER PUBLICATIONS

JP 2009093967 English translation. Yoshida et al. Japan. Apr. 30, 2009. (Year: 2009).*
(Continued)

*Primary Examiner* — Christopher P Domone
(74) *Attorney, Agent, or Firm* — Cheng Law Group, PLLC

(57) ABSTRACT

A method of production of a channel member for fuel cell use comprising a step of obtaining a sheet-shaped first conductor part 11 containing a carbon material of at least one of carbon nanotubes, granular graphite, and carbon fibers and a first resin, a step of laying a sheet-shaped second conductor part 21 containing a carbon material and a second resin with a lower melting point than the first resin to form a sheet-shaped base part 13, a step of transferring a grooved surface 51 to a surface to form a grooved base part 16 provided with groove part 15, a step of laying a sheet-shaped third conductor part 31 containing a carbon material and a third resin with a lower melting point than the first resin, and
(Continued)

a step of integrally joining the grooved base part and the third conductor part by hot melt bonding to cover the groove parts.

18 Claims, 11 Drawing Sheets

(51) Int. Cl.
| | |
|---|---|
| *H01M 8/1072* | (2016.01) |
| *H01M 8/1053* | (2016.01) |
| *H01M 8/1027* | (2016.01) |
| *H01M 8/0258* | (2016.01) |
| *H01M 8/0228* | (2016.01) |
| *H01M 8/0221* | (2016.01) |
| *H01M 8/0213* | (2016.01) |
| *H01M 8/026* | (2016.01) |
| *H01M 8/0206* | (2016.01) |
| *H01M 8/1018* | (2016.01) |
| *B01D 71/58* | (2006.01) |
| *B01D 71/82* | (2006.01) |
| *C08J 5/22* | (2006.01) |

(52) U.S. Cl.
CPC ......... *H01M 8/026* (2013.01); *H01M 8/0213* (2013.01); *H01M 8/0221* (2013.01); *H01M 8/0228* (2013.01); *H01M 8/0258* (2013.01); *H01M 8/1027* (2013.01); *H01M 8/1053* (2013.01); *H01M 8/1072* (2013.01); *B01D 71/58* (2013.01); *B01D 71/82* (2013.01); *C08J 5/2256* (2013.01); *H01M 2008/1095* (2013.01); *H01M 2300/0082* (2013.01); *H01M 2300/0091* (2013.01); *Y02P 70/50* (2015.11)

(56) References Cited

U.S. PATENT DOCUMENTS

| | | |
|---|---|---|
| 2007/0178349 A1 | 8/2007 | Iino et al. |
| 2009/0017361 A1 | 1/2009 | Lim et al. |
| 2010/0047650 A1 | 2/2010 | Iino et al. |
| 2012/0025420 A1 | 2/2012 | Utashiro et al. |
| 2015/0140204 A1 | 5/2015 | Suzuki et al. |
| 2016/0064746 A1 | 3/2016 | Iino et al. |

FOREIGN PATENT DOCUMENTS

| | | |
|---|---|---|
| JP | 2004-235137 A | 8/2004 |
| JP | 2004-273449 A | 9/2004 |
| JP | 2005-339874 A | 12/2005 |
| JP | 2007-134102 A | 5/2007 |
| JP | 2009-93967 A | 4/2009 |
| JP | 2009-176545 A | 8/2009 |
| JP | 2011-48957 A | 3/2011 |
| JP | 2011-171111 A | 9/2011 |
| JP | 2013-69449 A | 4/2013 |
| JP | 2013-247076 A | 12/2013 |
| JP | 5541291 B2 | 7/2014 |

OTHER PUBLICATIONS

International Search Report for the Application No. PCT/JP2015/080932 dated Feb. 2, 2016.

\* cited by examiner (a)

(b)

(c)

METHOD OF PRODUCTION OF CHANNEL MEMBER FOR FUEL CELL

CROSS-REFERENCE TO RELATED APPLICATIONS

This application is a Divisional Application of patent application Ser. No. 15/521,443, filed on Apr. 24, 2017, which is a 371 application of Application Serial No. PCT/JP2015/080932, filed on Nov. 2, 2015, which is based on Japanese Patent Application Nos. 2014-227989 and 2015-209859, filed on Nov. 10, 2014 and Oct. 26, 2015, respectively, the entire contents of which are hereby incorporated by reference.

TECHNICAL FIELD

The present invention relates to a method of production of a channel member for fuel cell use, more particularly relates to a method of production for forming a channel member provided with good workability of a resin and good conductivity.

Background Art

A fuel cell is a power generating device using a chemical reaction between stored hydrogen or hydrogen obtained by reforming alcohol or ether etc. and the oxygen in the air to obtain electric power. As typical fuel cells, there are phosphoric acid fuel cells (PAFC), molten carbonate fuel cells (MCFC), solid oxide fuel cells (SOFC), and polymer electrolyte fuel cells (PEFC). Among these fuel cells, polymer electrolyte fuel cells are more suitable for reduction of size compared with the other types. For this reason, polymer electrode fuel cells are perfect for mounting in passenger cars and other transport machinery where there are many restrictions on the installation location.

In the above-mentioned general polymer electrolyte fuel cells (PEFC), separators are arranged at both of the fuel electrode supplying the hydrogen (negative electrode/anode) and the air electrode supplying the oxygen (positive electrode/cathode). A membrane electrode assembly (MEA) is sandwiched between the two separators. This membrane electrode assembly is comprised of a proton conducting membrane at the two sides of which catalyst layers, water repelling layers, and at the outside of the same gas diffusion layers are stacked. Further, the necessary number of combinations of these are connected to form a fuel cell (for example, see PLTs 1 and 2).

As shown by the above-mentioned structure, hydrogen and oxygen are supplied to the membrane electrode assembly. In this case, water and electric power are produced from the hydrogen and oxygen and heat is also generated. If excessive heat is generated inside the cell, it affects the reaction efficiency and becomes a cause for a drop in amount of power generated. Further, it is also liable to obstruct, the discharge of water, the reaction product of the fuel, from the fuel cell. Therefore, in a polymer electrolyte fuel cell, along with the supply of hydrogen and oxygen, water or another cooling medium is supplied to predetermined portions inside the cell to stabilize the reaction temperature (similarly see PLTs 1 and 2).

To further raise the cooling effect due to the circulation of a cooling medium, the channels are made finer to increase the surface area of the channels. Further, by forming finer channels, it becomes possible to assemble them inside the membrane electrode assembly or other cell. This being so, it is possible to more efficiently cool the locations where heat is generated inside the cells.

Therefore, the method of preparing a channel member for fuel cell use which secures conductivity, is highly convenient for combination with a separator or membrane electrode assembly of a polymer electrolyte fuel cell, enables formation of finer channels, is suitable for the circulation of hydrogen, oxygen, a cooling medium, or other various fluids, and is inexpensive and easy to produce has been desired.

CITATION LIST

Patent Literature

PLT 1: Japanese Patent No. 5541291B2
PLT 2: Japanese Patent Publication No. 2011-48957A

SUMMARY OF INVENTION

Technical Problem

The present invention was made in consideration of the above situation and provides a method of preparing a channel member for fuel cell use which secures conductivity, is highly convenient for combination with a separator or membrane electrode assembly of a polymer electrolyte fuel cell, enables formation of finer channels, is suitable for the circulation of hydrogen, oxygen, a cooling medium, or other various fluids, and is inexpensive and easy to produce.

Solution to Problem

That is, the aspect of the invention of claim 1 is a method of production of a channel member for fuel cell use comprising a step of obtaining a sheet-shaped first conductor part containing a first resin and a carbon material, a step of laying a sheet-shaped second conductor part containing a second resin with a lower melting point than the first resin and a carbon material on at least one surface of the first conductor part to form a sheet-shaped base part, a step of transferring a grooved surface to a surface of the base part to form a grooved base part provided with groove parts, a step of laying a sheet-shaped third conductor part containing a third resin with a lower melting point than the first resin and a carbon material on the surface of the grooved base part where the groove parts are formed, and a step of integrally joining the grooved base part and the third conductor part by hot melt bonding to cover the groove parts.

The aspect of the invention of claim 2 is a method of production of a channel member for fuel cell use according to claim 1 wherein the groove parts are provided at the surface of the grooved base part where the second conductor part is laid.

The aspect of the invention of claim 3 is a method of production of a channel member for fuel cell use according to claim 1 wherein the groove parts are provided at the two surfaces of the grooved base part.

The aspect of the invention of claim 4 is a method of production of a channel member for fuel cell use according to claim 1 wherein the groove parts are provided at a surface of the grooved base part at the opposite side to the surface where the second conductor part is laid.

The aspect of the invention of claim 5 is a method of production of a channel member for fuel cell use according to claim 1 wherein instead of the third conductor part, another grooved base part is laid on the surface of the grooved base part where the groove parts are formed.

The aspect of the invention of claim 6 is a method of production of a channel member for fuel cell use according to claim 1 wherein the groove parts are relief-shaped groove parts.

The aspect of the invention of claim 7 is a method of production of a channel member for fuel cell use according to claim 6 wherein said relief-shaped groove parts are consecutive parallel structures of groove parts and ridge parts.

The aspect of the invention of claim 8 is a method of production of a channel member for fuel cell use according to claim 6 wherein groove depths of the relief-shaped groove parts are 50 to 200 μm and groove widths of the relief-shaped groove parts are 100 to 400 μm.

The aspect of the invention of claim 9 is a method of production of a channel member for fuel cell use according to claim 1 wherein the grooved base part is provided with a metal sheet.

The aspect of the invention of claim 10 is a method of production of a channel member for fuel cell use according to claim 9 wherein the metal sheet is provided with an adhesive resin layer containing a carbon material.

The aspect of the invention of claim 11 is the method of production of a channel member for fuel cell use according to claim 1 or 10 wherein the carbon material is at least one type of carbon nanotubes, granular graphite, or carbon fibers.

Advantageous Effects of Invention

According to the method of production of a channel member for fuel cell use according to the aspect of the invention of claim 1 there are provided a step of obtaining a sheet-shaped first conductor part containing a first resin and a carbon material, a step of laying a sheet-shaped second conductor part containing a second resin with a lower melting point than the first resin and a carbon material on at least one surface of the first conductor part to form a sheet-shaped base part, a step of transferring a grooved surface to a surface of the base part to form a grooved base part provided with groove parts, a step of laying a sheet-shaped third conductor part containing a third resin with a lower melting point than the first resin and a carbon material on the surface of the grooved base part where the groove parts are formed, and a step of integrally joining the grooved base part and the third conductor part by hot melt bonding to cover the groove parts, so it is possible to produce a channel member for fuel cell use which secures conductivity, is highly convenient for combination with a separator or membrane electrode assembly of a fuel cell, enables formation of finer channels, is suitable for the circulation of hydrogen, oxygen, cooling media, or other various fluids, and is inexpensive and easy to produce.

According to the method of production of a channel member for fuel cell use according to the aspect of the invention according to claim 2, there is provided the aspect of the invention of claim 1 wherein the groove parts are provided at the surface of the grooved base part where the second conductor part is laid, so the hot melt bonding with the later explained sheet-shaped third conductor part and covering of the groove parts become easy.

According to the method of production of a channel member for fuel cell use according to the aspect of the invention according to claim 3, there is provided the aspect of the invention of claim 1 wherein the groove parts are provided at the two surfaces of the grooved base part, so it is possible to simply form a plurality of channels in the vertical direction by a single working operation.

According to the method of production of a channel member for fuel cell use according to the aspect of the invention according to claim 4, there is provided the aspect of the invention of claim 1 wherein the groove parts are provided at a surface of the grooved base part at the opposite side to the surface where the second conductor part is laid, so this is convenient for combination with another grooved base part or another member in the fuel cell.

According to the method of production of a channel member for fuel cell use according to the aspect of the invention according to claim 5, there is provided the aspect of the invention of claim 1 wherein instead of the third conductor part, the grooved base part is laid, so this is convenient for combination with another grooved base part or another member in the fuel cell and in addition for enabling formation of a hierarchy of channels.

According to the method of production of a channel member for fuel cell use according to the aspect of the invention according to claim 6, there is provided the aspect of the invention of claim 1 wherein the groove parts are relief-shaped groove parts, so there are the advantages that shaping is relatively easy and further there is less waste.

According to the method of production of a channel member for fuel cell use according to the aspect of the invention according to claim 7, there is provided the aspect of the invention of claim 1 wherein the relief-shaped groove parts are consecutive parallel structures of groove parts and ridge parts, so the burden in manufacture of the mold itself is also lightened.

According to the method of production of a channel member for fuel cell use according to the aspect of the invention according to claim 8, there is provided the aspect of the invention of claim 6 wherein the groove depths of the relief-shaped groove parts are 50 to 200 μm and groove widths of the relief-shaped groove parts are 100 to 400 μm, so this is suitable from the viewpoint of the cooling efficiency by supply of a cooling medium in the fuel cell and the efficiency of supply and diffusion of hydrogen and oxygen to the separators and membrane electrode assembly.

According to the method of production of a channel member for fuel cell use according to the aspect of the invention according to claim 9, there is provided the aspect of the invention of claim 1 wherein the grooved base part is provided with a metal sheet, so it is possible to utilize this as a holding part when fastening the channel member for fuel cell use. Further, this is convenient for connection with outside wiring.

According to the method of production of a channel member for fuel cell use according to the aspect of the invention according to claim 10, there is provided the aspect of the invention of claim 9 wherein the metal sheet is provided with an adhesive resin layer containing a carbon material, so the conductivity of the adhesive resin layer itself is raised.

According to the method of production of a channel member for fuel cell use according to the aspect of the invention according to claim 11, there is provided the aspect of the invention of claim 1 or 10 wherein the carbon material is at least one type of carbon nanotubes, granular graphite, or carbon fibers, so despite the conductor part being formed from a resin material, it is possible to obtain conductivity due to the carbon material.

DESCRIPTION OF EMBODIMENTS

The channel member for fuel cell use produced according to the present invention is mainly a member to be assembled into a polymer electrolyte fuel cell (PEFC). Therefore, it is a channel for supply of hydrogen and oxygen for generating electric power by an electrochemical reaction and further for the supply of water or another cooling medium for controlling the temperature of the fuel cell. The features of the channel member are the use of a relatively simple structure and inexpensive cost and further the provision of electrical conductivity. First, the structure of the conductor parts and next the production process will be explained.

Figure 1:
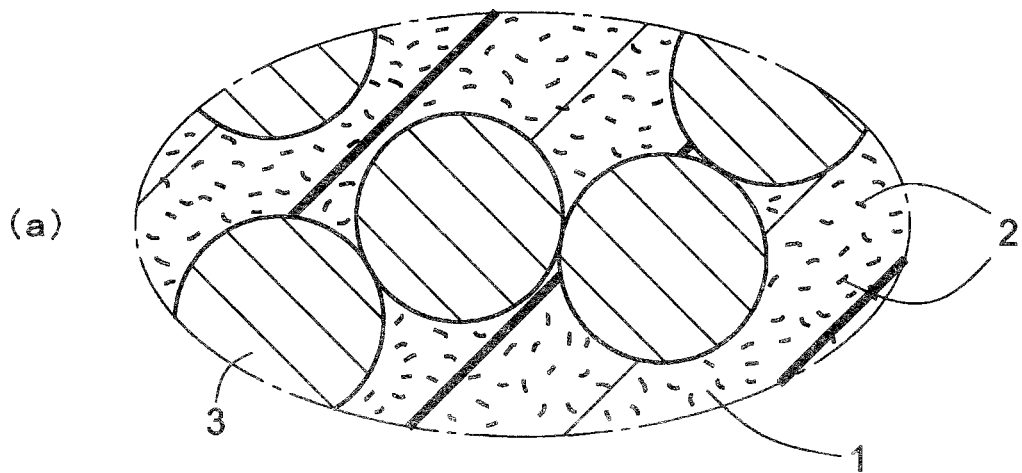
FIG. 1 is a partially enlarged cross-sectional schematic view of an internal state of a first conductor part etc.
Figure 1:
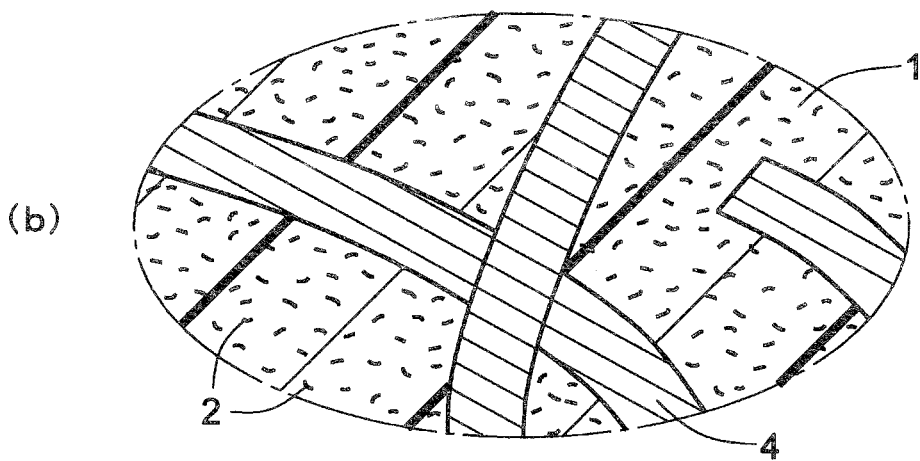
Figure 1:
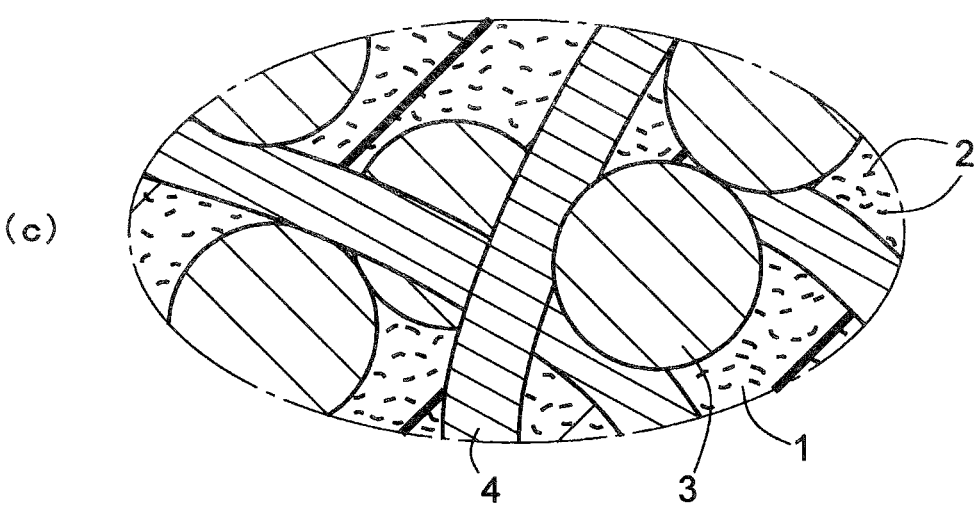

FIG. 1 is a partially enlarged cross-sectional schematic view showing in brief a later explained first conductor part and other conductor parts for a channel member for fuel cell use. In FIG. 1(a), inside the resin 1 (later explained first resin etc.), carbon nanotubes 2 are dispersed as a carbon material. Simultaneously, inside the resin, granular graphite 3 (spherical graphite) is also added as another carbon material. In FIG. 1(b), inside the resin 1, carbon nanotubes 2 are dispersed as a carbon material. Simultaneously, inside the resin, carbon fibers 4 are added as still another carbon material. In FIG. 1, (c) shows the case where all of the three types of carbon materials of the carbon nanotubes 2, granular graphite 3, and carbon fibers 4 are added inside of the resin 1. Despite the conductor parts being formed from a resin material, conductivity can be acquired due to the carbon material.

The carbon nanotubes 2 are made of a carbon compound comprised of carbon atoms of a diameter of 10 nm to 150 nm or so. The weight ratio of the carbon nanotubes in the total weight of the conductor parts is 15 to 30 wt %. If the amount of the carbon nanotubes is made extremely great, the viscosity of the resin rises and easily becomes a cause of shaping defects. Therefore, the above range is preferable. The carbon nanotubes themselves have conductivity. However, they have a 1/1000 or so size compared with other carbon materials and are extremely fine. Rather than for the purpose of improving the conductivity of the resin itself by just carbon nanotubes, they are mixed into the different conductor parts for the purpose of assisting the conductivity of the granular graphite 3 or carbon fibers 4 explained next.

Granular graphite 3 is substantially spherical graphite. The diameter (granular size) is made 5 μm or more, preferably 10 to 30 μm. The weight ratio of granular graphite in the total weight of the different conductor parts is 30 to 60 wt %. The grains of the granular graphite are placed in proximity or in contact inside the different conductor parts whereby the conductivity is directly improved.

The carbon fibers 4 are fibrous material obtained by carbonizing resin fibers and have fiber diameters (cross-sectional diameters) of about 5 to 30 μm. The fiber lengths are about 50 to 200 μm. In the case of mixing in carbon fibers 4, the weight ratio of carbon fibers in the total weight of the different conductor parts is 5 to 30 wt %. The carbon fibers are placed in proximity or in contact inside the different conductor parts whereby the conductivity is improved. Further, since being a fibrous state, a net structure is formed inside the conductor part and improved strength can be contributed to.

Figure 2:
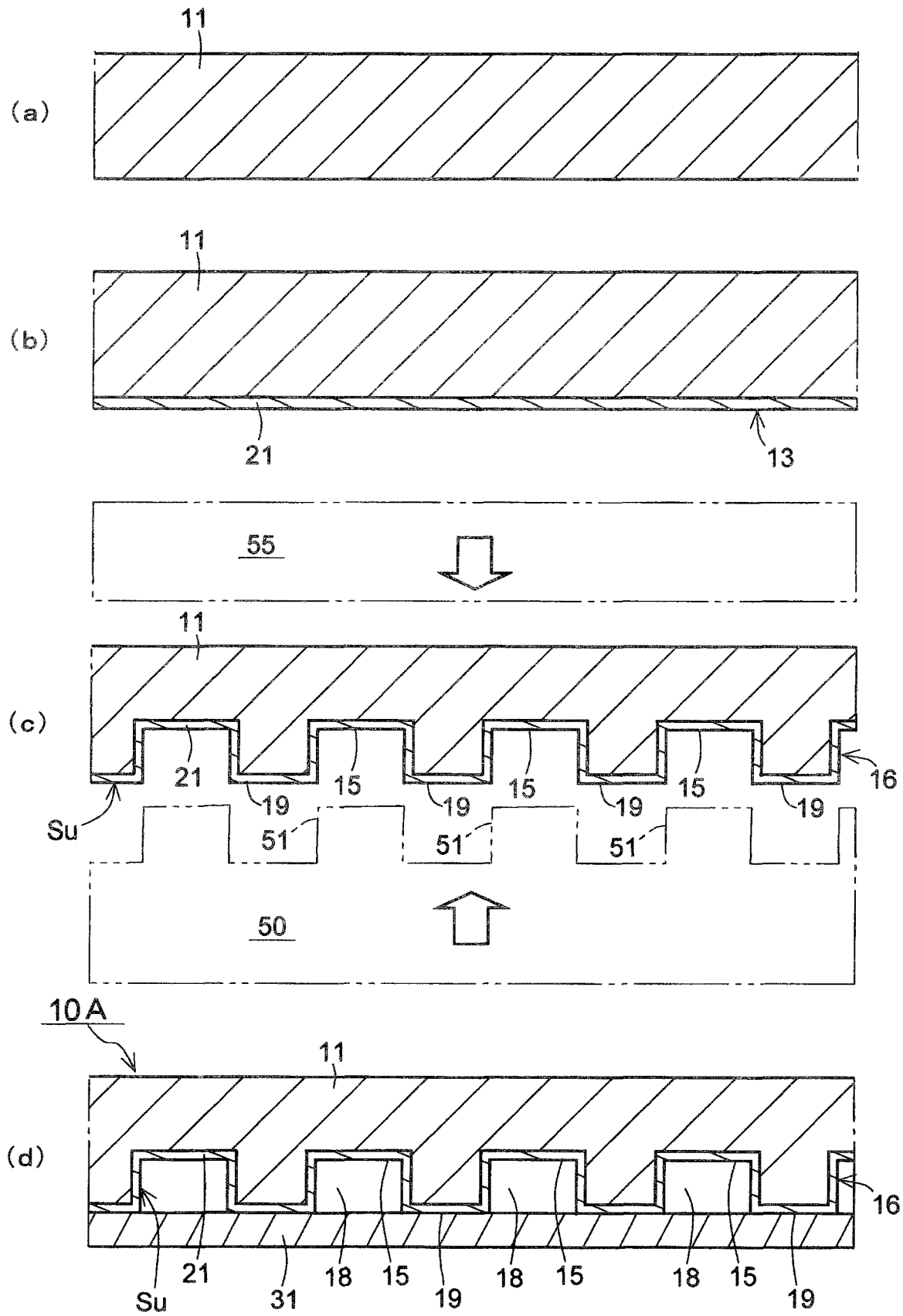
FIG. 2 is a general process diagram showing a method of production of a channel member for fuel cell use.

Which of the structures of FIGS. 1(a), (b), and (c) to employ for the first conductor part, second conductor part, and third conductor part explained in FIG. 2 on may be suitably considered by the thickness of the layer itself, properties of the resin, etc. Of course, while not shown, inclusion of only one type of carbon material is also possible. To further raise the conductivity and secure the strength of the conductor parts, as shown, two or more types of carbon materials are desirably mixed together.

While self evident, the resins forming the conductor parts are not conductive. For example, when the thickness of a conductor part is made greater, the insulating region also becomes greater. Even if increasing the ratio of granular graphite or carbon fibers for conductivity, there is an upper limit set from the viewpoint of maintaining the strength of the conductor parts. As a result, the space between granular graphite particles or the space between carbon fibers increases. At this time, due to the addition of the carbon nanotubes, it is believed that new paths for electrons are formed in the resin present between the separated particles of granular graphite or carbon fibers so as to connect the same. Therefore, more preferably, carbon nanotubes and spherical graphite, or carbon nanotubes and carbon fibers are mixed in, still more preferably all of carbon nanotubes, granular graphite, and carbon fiber are mixed in.

Next, using the schematic process chart of FIG. 2, the method of production of a channel member for fuel cell use of the present invention and the resin used will be explained in that order. First, as shown in FIG. 2(a), the sheet-shaped first conductor part 11 containing the above-mentioned carbon material and first resin (R1) is formed.

The first resin (R1) becomes the resin forming the part becoming the main body of the channel member for fuel cell use. Therefore, it is selected from resins relatively good in durability and easy to work. For example, an ethylene homopolymer, a propylene homopolymer (homopolypropylene), a random copolymer of ethylene and one or more α-olefins of propylene, 1-butene, 1-pentene, 1-hexene, 4-methyl-1-pentene, etc., a block copolymer of the above compositions, etc. may be mentioned. Further, it may be a mixture of the above polymers or another polyolefin-based resin, petroleum resin, terpene resin, or other hydrocarbon-based resin.

To the first resin (R1), as the above-mentioned carbon material, at least one of carbon nanotubes, granular graphite, and carbon fibers were added. Further, to the first resin, a carbon material was included and a sheet-shaped first conductor part 11 was formed (step of FIG. 2(a)).

Next, a second resin (R2) with a melting point lower than the above-mentioned first resin (R1) was prepared. This second resin is a resin used for facilitating hot melt bonding. The second resin corresponds to an adhesive of the first conductor part 11. If considering the compatibility of the second resin (R2) and the first resin (R1), the difficulty in peeling, etc., it is preferable to use a resin having a low melting point and the same in type as the first resin.

Further, the second resin (R2) can be selected from an acid-modified polyolefin resin. As the acid-modified polyolefin resin, a polyolefin-based resin modified by an unsaturated carboxylic acid or its derivative may be suitably used. As such an unsaturated carboxylic acid, acrylic acid, methacrylic acid, maleic acid, fumaric acid, crotonic acid, itaconic acid, citraconic acid, etc. may be mentioned. Esters or anhydrides of these may also be used. Further, as the derivative, methyl acrylate, methyl methacrylate, ethyl acrylate, propyl acrylate, butyl acrylate, butyl methacrylate, vinyl acetate, glycidyl acrylate, glycidyl methacrylate, acrylamide, methacrylamide, sodium acrylate, etc. may be mentioned.

As the polyolefin-based resin able to be used for the acid-modified polyolefin resin, polyethylene, polypropylene, polybutene, and their copolymers, ethylene-vinyl acetate copolymer, ethylene-acrylic acid ester copolymers etc. may be mentioned. At this time, the amount of the unsaturated carboxylic acid or its derivative contained in the polyolefin-based resin is preferably 0.001 to 3 wt %, more preferably 0.01 to 1 wt %, particularly preferably 0.03 to 0.5 wt %. If the amount of modification in the modified product is small, the effect of improvement of the interlayer adhesion is poor, while conversely if too great, a cross-linking reaction occurs and the shapeability becomes poor, so this is not preferred. Further, by mixing into these bondable resins polyisobutylene, ethylene-propylene rubber, or other rubber elastomer component or a polyolefin-based resin different from the polyolefin-based resin of the matrix of the bondable resin, the bondability is sometimes improved, so this is useful.

The second resin (R2) also may have one or more of carbon nanotubes, granular graphite, and carbon fibers added to it as the above-mentioned carbon material. Further, a carbon material is included in the second resin and a sheet-shaped second conductor part 21 is formed. The second conductor part 21 is laid on at least one surface of the first conductor part 11. In this way, a sheet-shaped base part 13 is formed (step of FIG. 2(*b*)).

A mold 50 is prepared for forming the channels in the channel member. This mold 50 is formed with a relief-grooved surface 51 in a comb tooth manner. The mold 50 is pressed against the surface of the flat sheet-shaped base part 13. The grooved surface 51 of the mold 50 is transferred to the base part 13 whereupon the groove parts 15 are formed. Note that, in the illustration, the other surface of the base part 13 is finished flat, so a separate flat plate-shaped mold 55 is prepared and pressed against the surface to which a grooved surface is not to be transferred. The pressing operation using the molds is performed at the stage where the resin forming the base part 13 is fluid. In this way, the grooved base part 16 provided with the groove parts 15 is formed (step of FIG. 2(*c*)). With this grooved base part 16, groove parts 15 are provided at the surface to which the second conductor part 21 is laid. The groove parts are formed at this surface, so hot melt bonding with the sheet-shaped third conductor part and coverage of the groove parts explained later become easy.

The grooved surface 51 of the illustrated mold 50 forms consecutive relief shapes. The ridges are parallel. The grooved surface 51 of the mold 50 is transferred to the base part 13 whereby the base part 13 is formed with relief-shaped groove parts Su comprised of consecutive parallel groove parts 15 (groove bottoms) and ridge parts 19. This shape is relatively easy to form and is less wasteful. Further, the burden in manufacture of the mold itself is lightened. The size of the relief-shaped groove parts is suitably determined, but the groove depth is 50 to 200 μm and the groove width is 100 to 400 μm. These thicknesses are suitable from the viewpoint of the cooling efficiency by supply of cooling medium to the inside of the fuel cell and the efficiency of supply and diffusion of hydrogen and oxygen to the separator and membrane electrode assembly. In the Description and the Drawings, FIG. 3 on, the relief-shaped groove parts are structures of consecutive parallel groove parts and ridge parts. Note that the shape of the grooved surface of the mold is not limited to the illustrated one and can be made any necessary shape. For example, the grooved surface may be made a continuous zigzag shape etc.

Furthermore, a third resin (R3) with a melting point lower than the above-mentioned first resin (R1) is prepared. This third resin is a resin which melt bonds with the above-mentioned second conductor part. If considering the compatibility of the third resin (R3) and second resin (R2), the difficulty in peeling, etc., it is preferable to use a resin having a lower melting point and the same in type as the first resin or a resin with a lower melting point and the same in type as the second resin. This can be selected from acid-modified polyolefin resins similar to the second resin.

In the third resin (R3) as well, as the above-mentioned carbon material, at least one of carbon nanotubes, granular graphite, and carbon fibers are added. In the third resin as well, a carbon material is contained and a sheet-shaped third conductor part 31 is formed. Further, the third conductor part 31 is laid on the surface of the grooved base part 16 where the groove parts 15 are formed. After being laid, the grooved base part 16 and the third conductor part 31 are heated to the melting temperature of the third resin of the third conductor part 31. By doing this, hot melt bonding occurs between the third conductor part 31 and the second conductor part at the grooved base part 16 side and the two are integrally joined (step of FIG. 2(*d*)).

As a result, the groove parts 15 of the grooved base part 16 are covered by the third conductor part 31. That is, the third conductor part 31 becomes lids of the groove parts 15. In this way, the parts of the groove parts 15 become pipeline-shaped fluid channels 18 whereby a channel member for fuel cell use 10A is formed. As will be understood from the explanation up to here, when the first conductor part 11, grooved base part 16, and third conductor part 31 as a whole are pressed and heated, since the second resin (R2) of the second conductor part 21 and the third resin (R3) of the third conductor part 31 have melting points lower than the first resin (R1) of the first conductor part 11, they melt relatively earlier than the first resin (R1). For this reason, the second conductor part 21 and the third conductor part 31 of the grooved base part 16 melt bond. On the other hand, the first conductor part 11 of the grooved base part 16 remains holding its initial shape without melting. In this way, it is possible to utilize the difference in melting points to simply cover and close the groove parts.

The melting point of a resin in the series of explanations above is a value found by differential scanning calorimetry (DSC). When there are two or more peak values in measurement, the value of the peak becoming relatively larger is employed for the melting point of the resin.

When adding one or more of carbon nanotubes, granular graphite, and carbon fibers as a carbon material to the first resin (R1), second resin (R2), and third resin (R3), predetermined amounts of the desired carbon material are weighed and kneaded by a heating- and melting-capable blender or kneader etc. so as to become uniform in the resin. After that, the kneaded blend of the resins is coextruded from the T-die etc. and laid. Alternatively, the kneaded blend of the different resins is laid alone and run through a rolling roller etc. to a predetermined thickness. Suitable means and apparatuses for working the resin are used for these operations.

Figure 3:
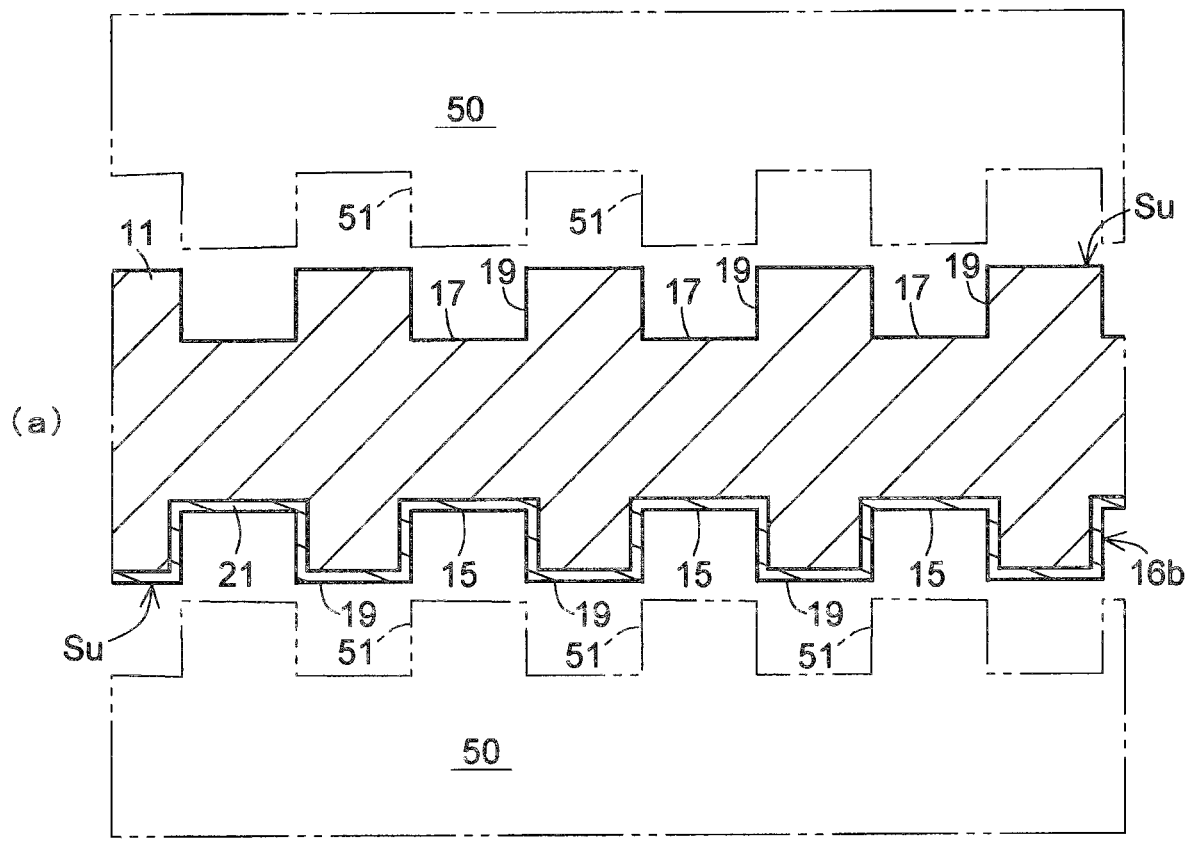
FIG. 3 is a cross-sectional schematic view of a second embodiment of a grooved base part.
Figure 3:
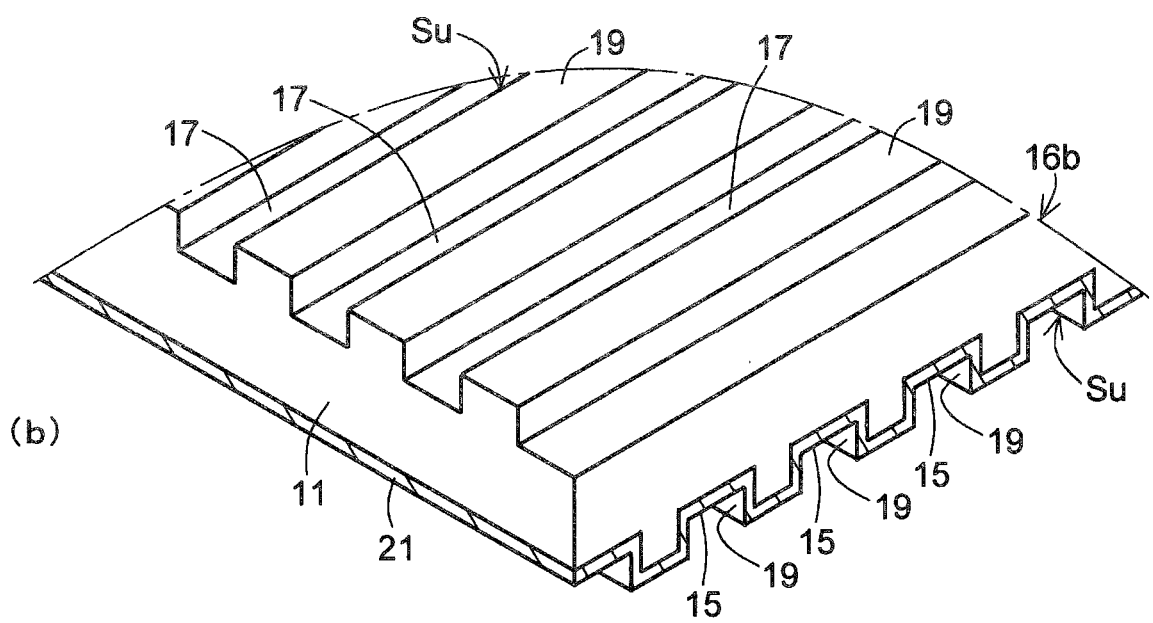
Figure 4:
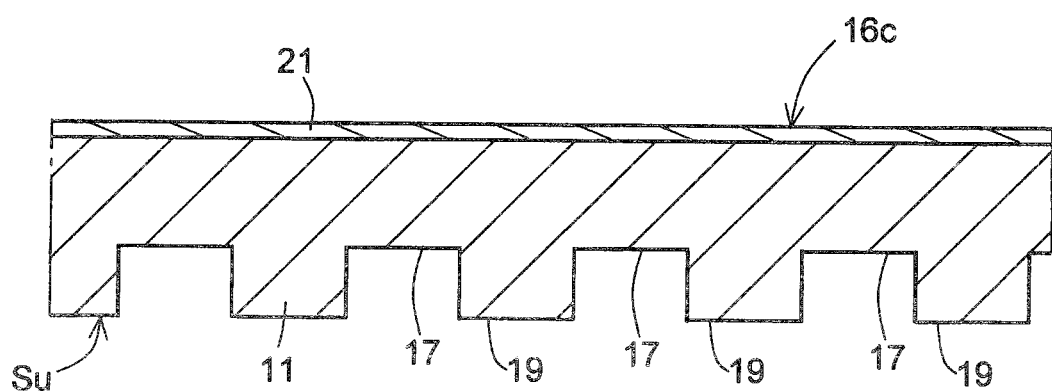
FIG. 4 is a cross-sectional schematic view of a third embodiment of a grooved base part.

FIG. 3 is a cross-sectional schematic view of a grooved base part 16b of a second embodiment. In this grooved base part 16b, groove parts 15 (first groove parts) and groove parts 17 (second groove parts) are provided at the two surfaces. FIG. 4 is a cross-sectional schematic view of a grooved base part 16c of a third embodiment. At this grooved base part 16c, groove parts 17 (second groove parts) are provided at the surface at the opposite side to the surface where the second conductor part 21 is laid. Note that, in an embodiment providing groove parts at the two surfaces like the grooved base part 16b, the directions of the grooves of the groove parts may be made the same (FIG. 3(a)) or may be made perpendicular (that is, may be deviated by predetermined angles) (FIG. 3(b)).

If employing the grooved base part 16b of the second embodiment, it is possible to easily form a plurality of channels in the vertical direction by a single working operation. Further, the grooved base part 16c of the third embodiment is convenient for combination with another grooved base part or another member inside the fuel cell. If using these grooved base parts, for example, it becomes possible to group together not only the channels for the cooling media, but also the channels for oxygen, channels for hydrogen, and other channels. This is helpful for reducing the volume of the members more. Note that, the second conductor parts 21 may also be laid at the two surfaces of the grooved base parts 16b, 16c (not shown). In this case, lamination by hot melt bonding becomes simpler.

Figure 5:
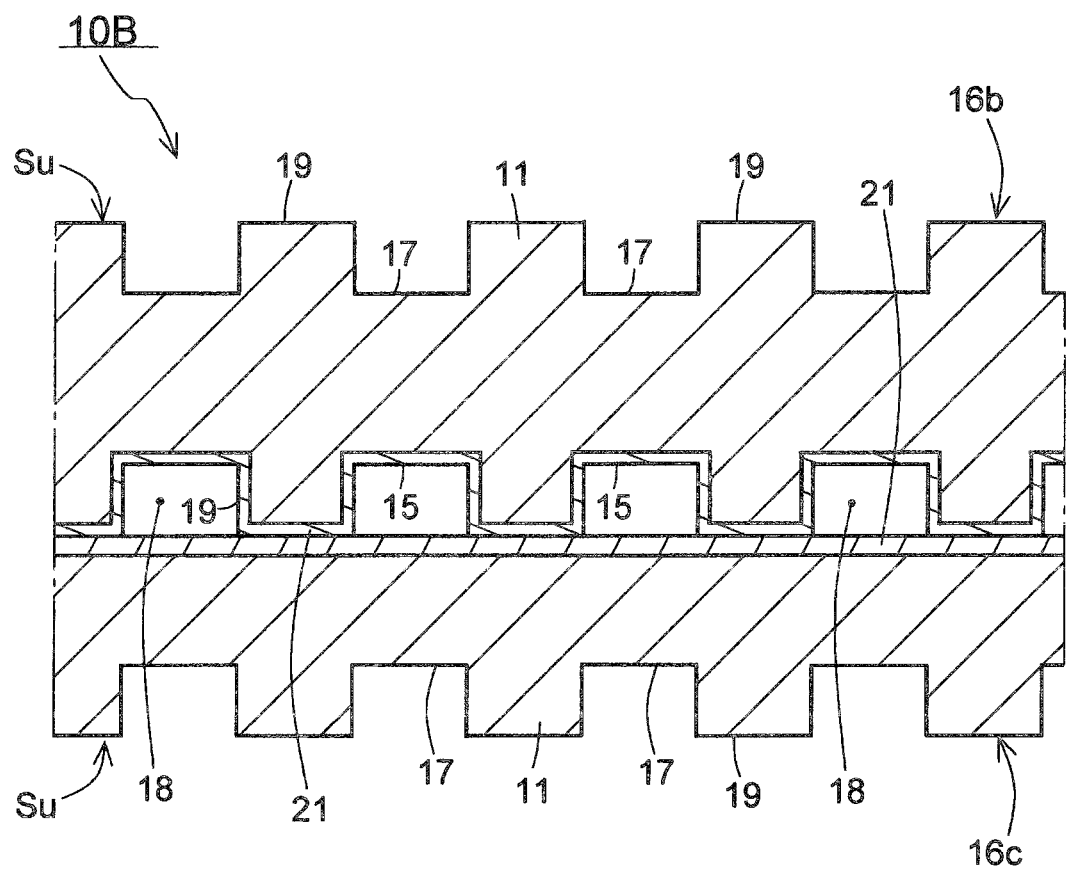
FIG. 5 is a cross-sectional schematic view of a channel member for fuel cell use of a second embodiment.

FIG. 5 is a cross-sectional schematic view of a channel member for fuel cell use 10B of a second embodiment. In the channel member for fuel cell use 10B, a grooved base part 16c (see FIGS. 3 and 4) is combined by being laid at the grooved base part 16b. Further, the channel member for fuel cell use 10B is formed by hot melt bonding. If grasped from the illustration, at the center part, the groove parts 15 are closed whereby pipeline-shaped fluid channels 18 are formed. Further, groove parts 17, 15 are exposed at the two surfaces of the channel member for fuel cell use 10B in the vertical direction. The feature of this embodiment is that it is possible to form a hierarchy with the channels of other grooved base parts. Further, this is convenient for combination with other members in the fuel cell. In addition, these can also be utilized as groove parts for air-cooling. In FIG. 5 as well, it is possible to lay second conductor parts 21 on the two surfaces as well (not shown).

Figure 6:
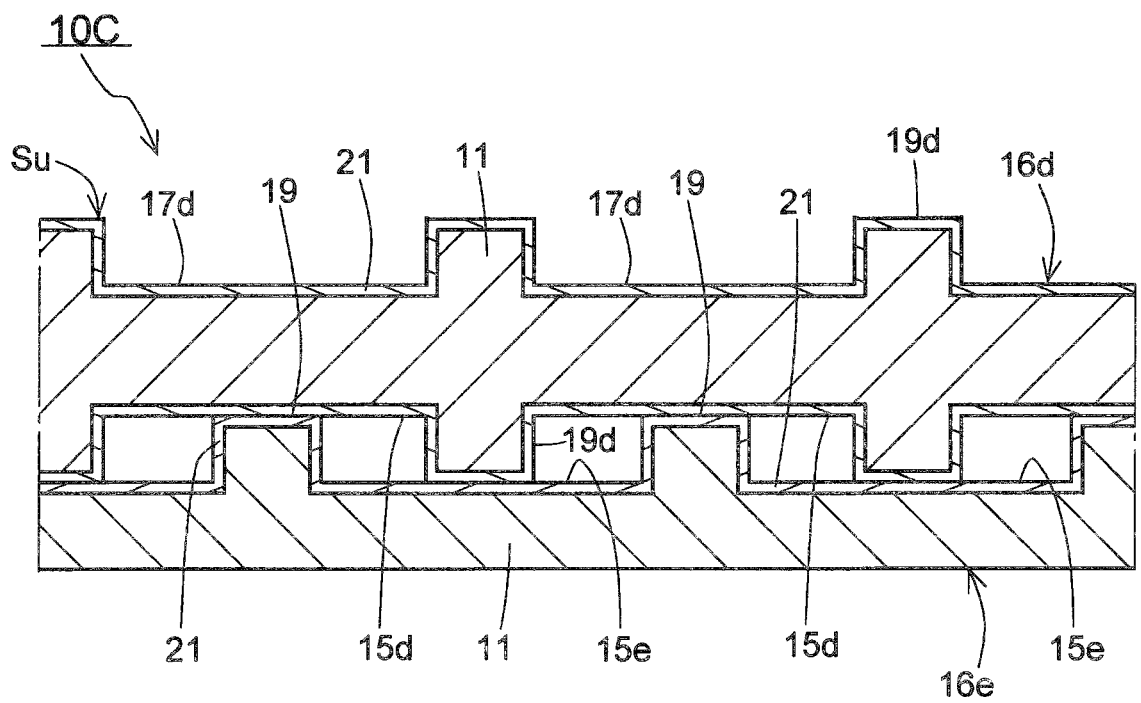
FIG. 6 is a cross-sectional schematic view of a channel member for fuel cell use of a third embodiment.

FIG. 6 is a cross-sectional schematic view of a channel member for fuel cell use 10C of a third embodiment. In the channel member for fuel cell use 10C, the groove parts are shaped as a succession of relief shapes and are large in groove widths. At the center parts of the groove parts of the grooved base part 16d formed at both surfaces with groove parts 15d, 17d and ridge parts 19d, ridge parts 19 (between groove parts) of the grooved base part 16e formed with groove parts 15e at only a single surface are combined. In this way, since all of the members are worked resin parts, design of the shape is easy. Further, it is possible to change one grooved base part so as to suitably adjust the area of the vertical cross-section of the channels. For this reason, the convenience as a member assembled into a fuel cell is improved. At the grooved base part 16d, second conductor parts 21 are laid at the two surfaces.

Figure 7:
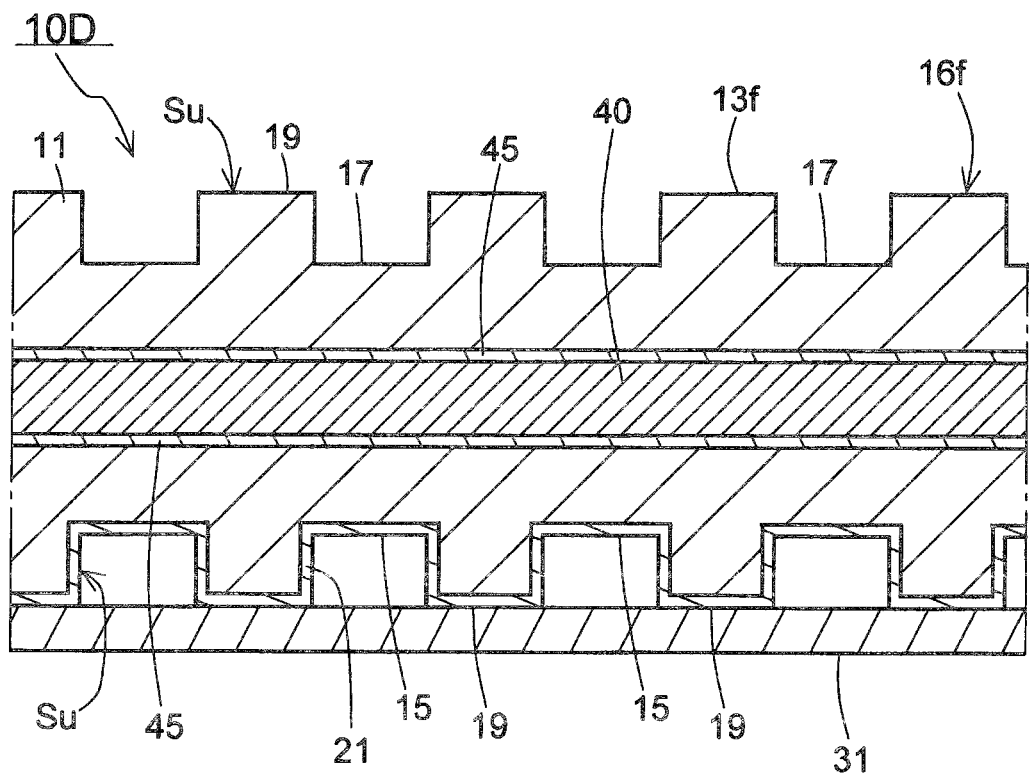
FIG. 7 is a cross-sectional schematic view of a channel member for fuel cell use of a fourth embodiment.
Figure 8:
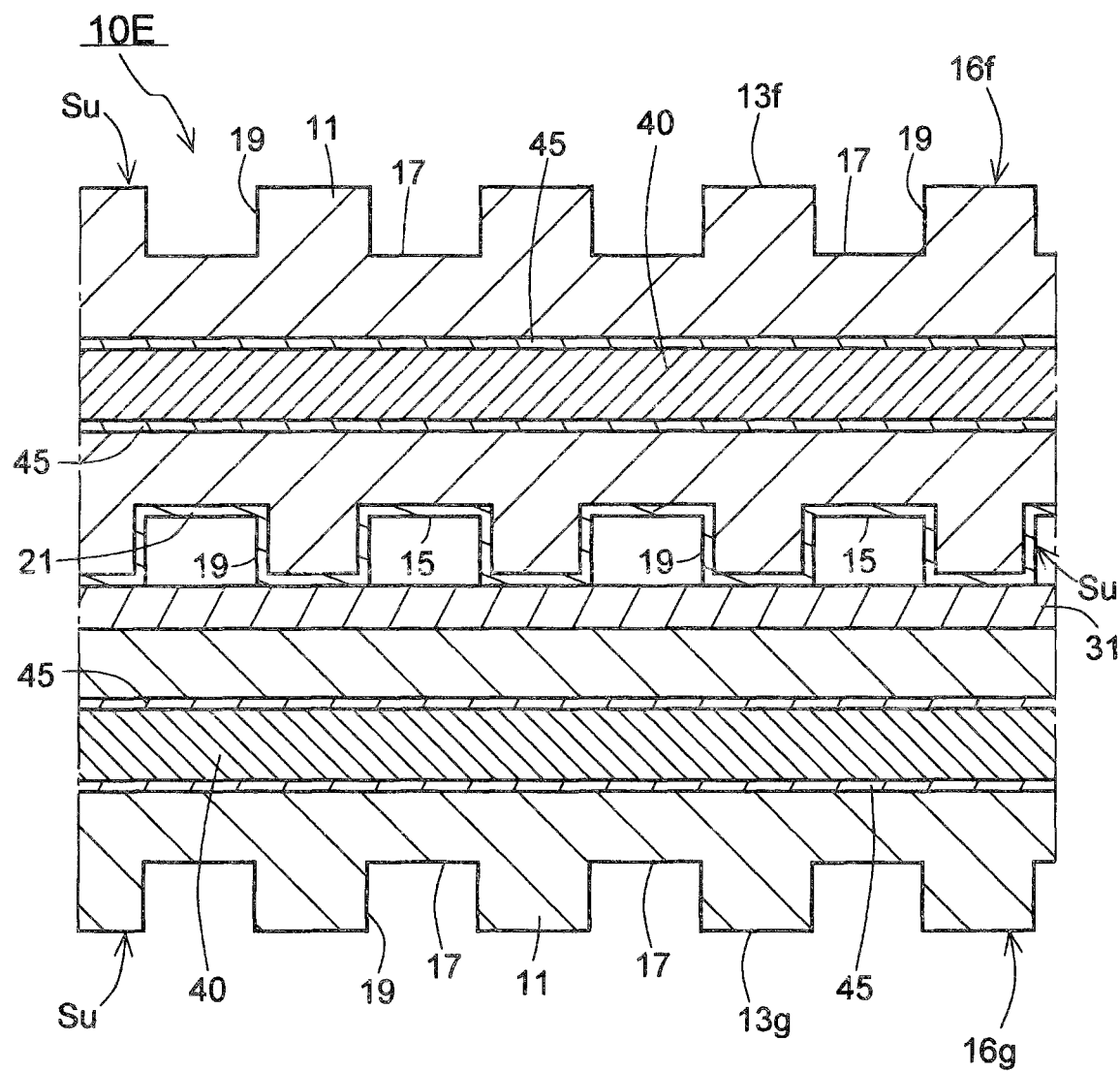
FIG. 8 is a cross-sectional schematic view of a channel member for fuel cell use of a fifth embodiment.

FIG. 7 is a cross-sectional schematic view of a channel member for fuel cell use 10D of a fourth embodiment, while FIG. 8 is a cross-sectional schematic view of a channel member for fuel cell use 10E of a fifth embodiment. At the channel members for fuel cell use 10D and 10E, a metal sheet 40 is provided inside of the grooved base parts 16f and 16g. The metal sheet is utilized as a holding part when connecting and fastening the channel member for fuel cell use to the fuel cell. Further, electrons can move inside the metal sheet, so this is connected with outside wiring. For example, this is effective for serial connection. For the material of the metal sheet, corrosion resistance etc. are considered. Therefore, a stainless steel sheet, titanium sheet, aluminum sheet, or other metal sheet is used. Further, a metal sheet obtained by gold plating, nickel plating, carbon plating, or otherwise surface treating the above-mentioned metal sheet (for example, a gold-plated stainless steel sheet etc.) is also preferably used. The thickness of the metal sheet is about 8 to 200 μm in range. If the metal sheet becomes thinner, the volume of the fuel cell itself can be reduced and the power generating performance per cell volume can be raised. Between the first resin (R1) and the metal sheet 40 of the grooved base part 16f (16g), preferably an adhesive resin layer 45 is interposed. The adhesive resin layer improves the bondability of both the grooved base part and metal sheet.

The resin forming the adhesive resin layer 45 is selected from the acid-modified polyolefin resins of the composition of the above-mentioned second resin (R2) or third resin (R3). As explained above, an acid-modified polyolefin resin is a polyolefin-based resin modified by an unsaturated carboxylic acid or a derivative of the same. Illustration of the types of resins used is omitted since the explanations would overlap. To the resin of the adhesive resin layer 45, as the carbon material, one or more of carbon nanotubes, granular graphite, and carbon fibers are added. This is to raise the conductivity of the adhesive resin layer 45 itself.

The thickness of the adhesive resin layer 45 is adjusted at the extrusion and rolling stages. Note that, if made too thick, the conductivity deteriorates even if a carbon material is included. Therefore, the thickness of the adhesive resin layer 45 is generally made 100 μm or less, more preferably 50 μm or less.

The adhesive resin layer 45 and the metal sheet 40 are bonded by hot melt bonding, so the resin is strongly stuck to the metal. The acid-modified polyolefin resin has polar groups. Due to this, the bond becomes stronger due to the effect of ion bonds between the polar groups of the resin and the metal atoms. For example, a resin sheet later forming the adhesive resin layer 45 is placed at both surfaces or one surface of the metal sheet 40. These are inserted between a heating plate and heating rollers and hot melt bonded. In this way, an integral unit of a metal sheet 40 and adhesive resin layer 45 is formed.

Next, at one surface or both surfaces of adhesive resin layers 45 joined integrally with the metal sheet 40, a sheet-shaped first conductor part 11 is laid. Further, a sheet-shaped second conductor part 21 is also laid at the first conductor part 11. The first conductor part 11 and the second conductor part 21 may be laid with separate sheet-shaped articles overlaid or may be simultaneously extruded from a T-die etc. In this way, sheet-shaped base parts 13f, 13g provided with metal sheets 40 are formed. Grooved surfaces are transferred to the base parts 13f, 13g whereby the grooved base parts 16f, 16g are formed.

In FIG. 7, a grooved base part 16f provided with groove parts 15, 17 at the two surfaces is prepared. A third conductor part 31 is laid over the surface of the grooved base part 16f where the second conductor part 21 is laid. After that, in the same way, the groove parts 15 of the grooved base part 16f are covered by the third conductor part 31 by being integrally joined by hot melt bonding. FIG. 8 is an example corresponding to the above-mentioned FIG. 5. Two members are formed: a grooved base part 16f provided with groove parts 15, 17 at its two surfaces and a grooved based part 16g provided with groove parts 15 at one surface. Further, based on the grooved base part 16f, the surface of the grooved base part 16f where the second conductor part 21 is laid and the surface of the grooved base part 16g where the second conductor part 21 is laid are bonded together. After that, in the same way, the groove parts 15 of the grooved base part 16f are covered by the grooved base part 16g by being integrally joined by hot melt bonding. At the grooved base parts 16f, 16g as well, the second conductor parts 21 can be laid at the two surfaces (not shown).

Figure 9:
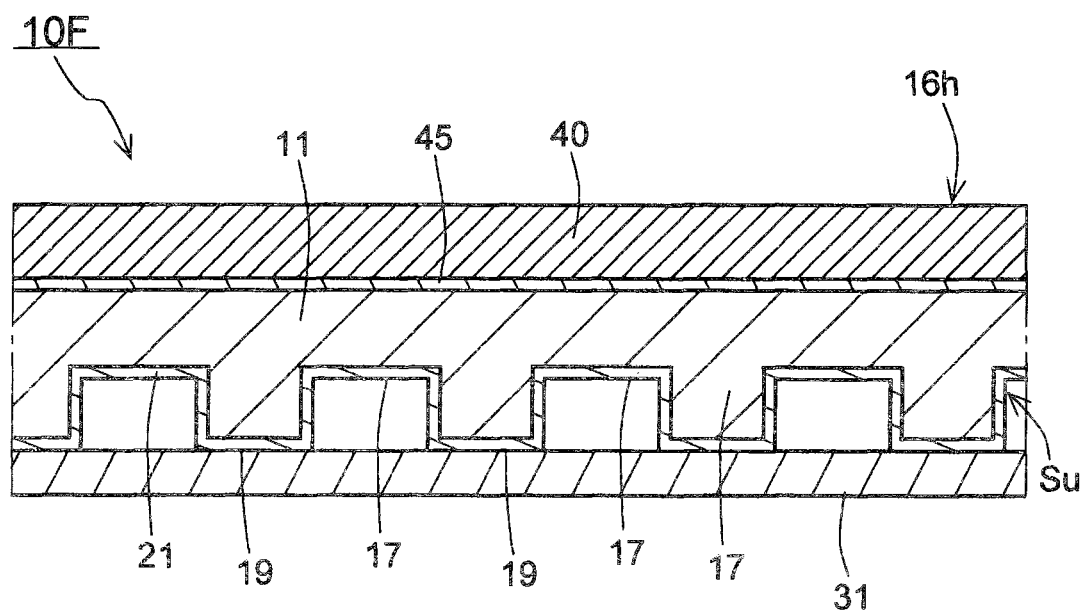
FIG. 9 is a cross-sectional schematic view of a channel member for fuel cell use of a sixth embodiment.

FIG. 9 is a cross-sectional schematic view of a channel member for fuel cell use 10F of a fifth embodiment. In the channel member for fuel cell use 10F, the metal sheet 40 is exposed to the outside. In the grooved base part 16h, the adhesive resin layer 45, first conductor part 11 (first resin), and second conductor part 21 (second resin) are laid on the metal sheet 40 in that order. Further, the grooved surface is transferred and groove parts 15 are formed. Next, the third conductor part 31 is laid on the surface of the grooved base part 16h where the groove parts 15 are formed. The methods of working the channel members for fuel cell use 10D, 10E, and 10F disclosed in FIG. 7 to FIG. 9 are similar to that of the channel member for fuel cell use 10A (see FIG. 2).

In this way, a channel member for fuel cell use secures conductivity while using a resin and further can be freely designed in shape. Therefore, it is possible to make it the optimal form for the part required in the fuel cell. Therefore, this can be effectively used not only for channels for water and other cooling media, but also the supply of oxygen and hydrogen and further the discharge of generated steam etc.

EXAMPLES

Figure 10:
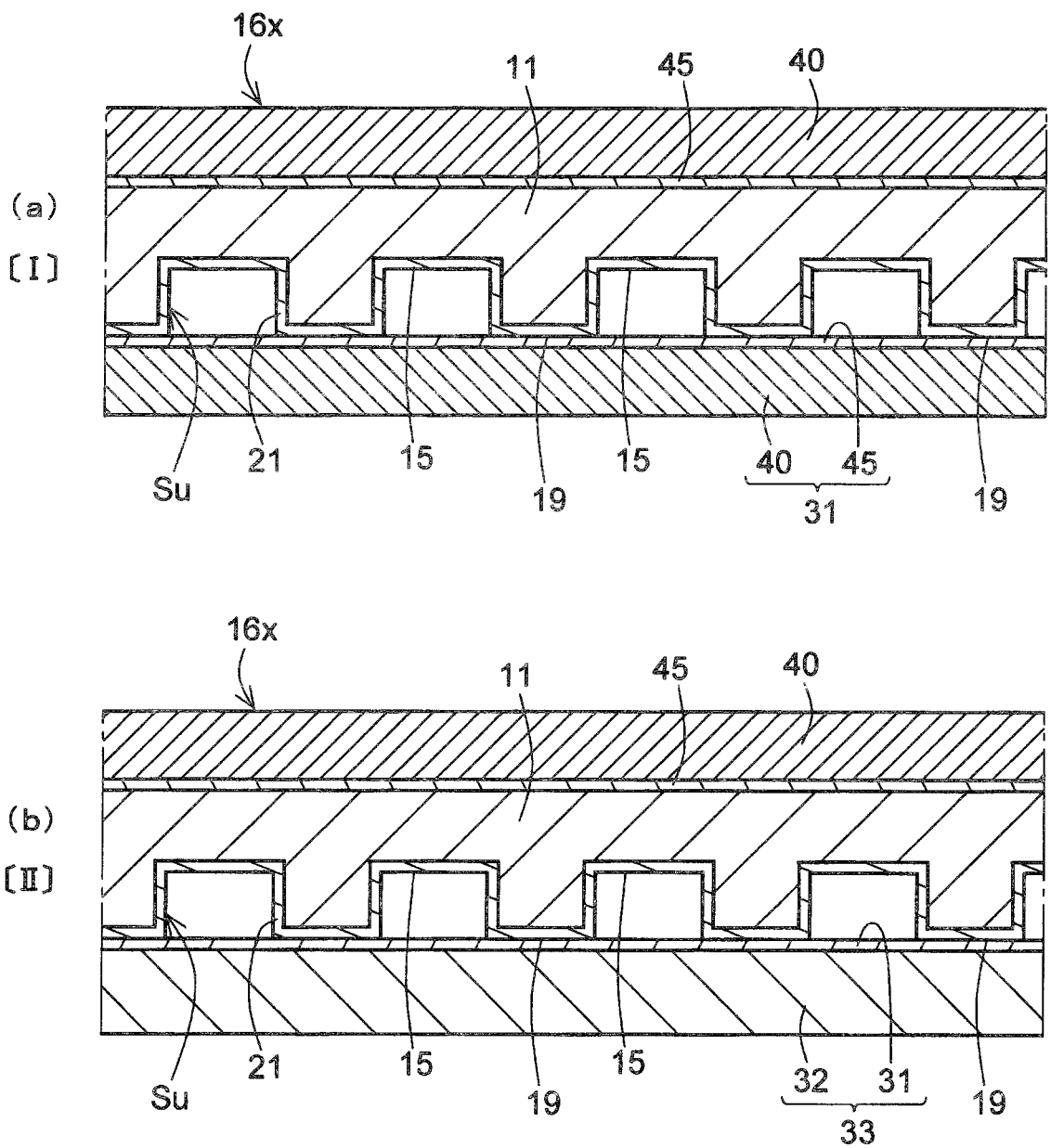
FIG. 10 is a cross-sectional schematic view of a channel member for fuel cell use of an example of design verification.
Figure 11:
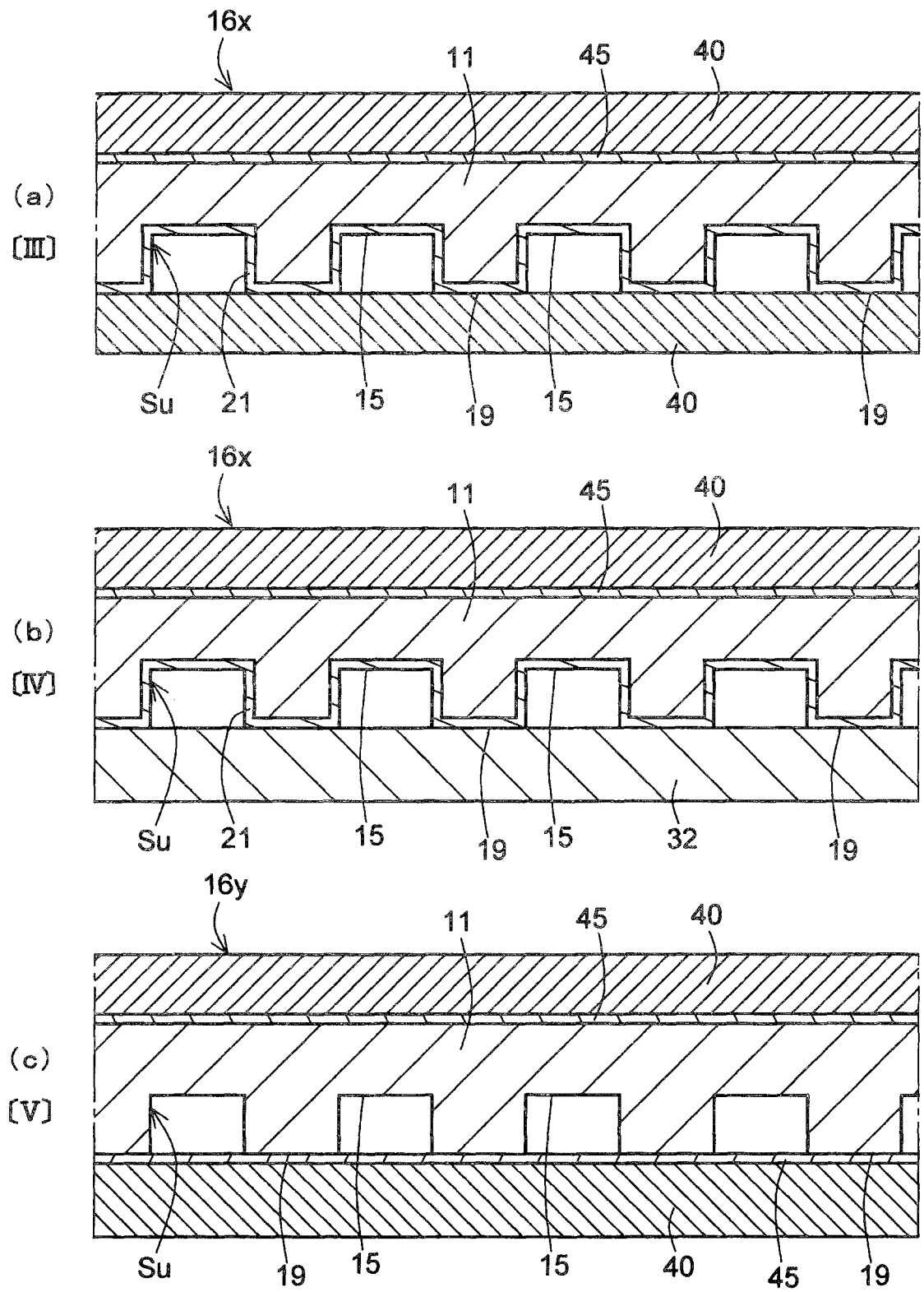
FIG. 11 is a cross-sectional schematic view of a channel member for fuel cell use of comparative example in design verification.

The inventors prepared channel members for fuel cell use of Examples 1 to 6 and Comparative Examples 1 to 8 based on the structures of the cross-sectional schematic views of FIG. 10 and FIG. 11 ([I] to [V]) based on the formulations disclosed in the later explained Tables 1 to 3 using the following starting materials: Further, the channel members for fuel cell use of the examples and comparative examples were described for the structure of FIG. 10 and FIG. 11 (any of [I] to [V]), the conditions of hot melting bonding of the temperature (° C.) and pressure (MPa), the thicknesses before and after the hot melt bonding (µm), the penetration resistance (mΩ·cm$^2$) before and after hot melt bonding, and the evaluation of the bonding and shape retention (good/poor).

Starting Materials Used

As the first resin, homopolypropylene (made by Japan Polypropylene Corporation, Novatec FL100A, melting point 161° C., below referred to as "PP") was used.

As the second resin or third resin with melting points lower than the first resin, the following resins were used.

Maleic anhydride-modified low density polyethylene (made by Mitsubishi Chemical, Modic M504, melting point 121° C., below referred to as "modified LL")

Low density polyethylene (made by Ube-Maruzen Polyethylene, Umerit 4540F, melting point 134° C., below referred to as "LL")

For the base member resin as well, resin pellets were frozen and crushed to obtain powder for use.

The following were used for the conductive carbon material. Carbon nanotubes: made by Showa Denko, VGCF-X (fiber diameter: 10 to 15 nm, below referred to as "CNT")

Granular graphite: made by Nippon Carbon, Nicabeads P25B-ZG (average particle size: true density: 2.17 g/cm$^3$, below referred to as "SG")

Carbon fibers: made by Mitsubishi Plastics, Dialead K223HE (fiber diameter: 11 µm, true density: 2.0 g/cm$^3$, below referred to as "CF")

As the metal sheet, the following members were used:

Stainless steel sheet gold plated on both surfaces (SUS316L, thickness 100 µm) was used. Below, referred to as "gold-plated stainless steel sheet".

Aluminum foil (made by UACJ Foil Corporation, "Nippaku Foil", thickness 12 µm) was used. Below, referred to as "aluminum foil".

The mold for forming the groove parts was made a grooved surface of consecutive rectangular shapes (block shapes) in cross-sectional view with distances between grooves of 350 µm, groove widths of 200 µm, and groove depths of 100 µm. The mold for the flat surface was made a flat plate shape as is. The mold was made the same in all of the examples and comparative examples.

FIG. 10(a) shows the case of laying a metal sheet 40, adhesive resin layer 45, first conductor part 11, and second conductor part 21 in that order to prepare a grooved base part 16x provided with groove parts 15. To this, as a third conductor part 31, a metal sheet 40 provided with an adhesive resin layer 45 was laid and joined integrally by hot melt bonding (Structure [I]).

FIG. 10(b) shows the case of laying a metal sheet 40, adhesive resin layer 45, first conductor part 11, and second conductor part 21 in that order to prepare a grooved base part 16x provided with groove parts 15. To this, a composite 33 comprised of a sheet-shaped article 32 of a first resin containing a carbon material provided with a third conductor part 31 was laid and joined integrally by hot melt bonding (Structure PIP.

FIG. 11(a) shows the case of laying a metal sheet 40, adhesive resin layer 45, first conductor part 11, and second conductor part 21 in that order to prepare a grooved base part 16x provided with groove parts 15. To this, just a metal sheet 40 was laid and joined integrally by hot melt bonding (Structure [III]).

FIG. 11(b) shows the case of laying a metal sheet 40, adhesive resin layer 45, first conductor part 11, and second conductor part 21 in that order to prepare a grooved base part 16x provided with groove parts 15. To this, just a sheet-shaped article 32 of the first resin containing a carbon material was laid and joined integrally by hot melt bonding (Structure [IV]).

FIG. 11(c) shows the case of laying a metal sheet 40, adhesive resin layer 45, and first conductor part 11 in that order to prepare a grooved base part 16y provided with groove parts 15. To this, a metal sheet 40 provided with an adhesive resin layer 45 was laid and joined integrally by hot melt bonding (Structure [V]).

Preparation of Channel Members for Fuel Cell Use of Examples and Comparative Examples

Example 1

To 100 parts by weight of the first resin (PP), carbon nanotubes (CNT): 114 parts by weight and granular graphite (SG): 241 parts by weight were mixed and uniformly kneaded while heating to 170° C. The kneaded matter was passed through a calender roll machine heated to a temperature 1° C. to 5° C. lower than the melting point of the resin to obtain a thickness 60 μm sheet-shaped first conductor part. The second conductor part and adhesive resin layer were made the same. To 100 parts by weight of the maleic anhydride-modified low density polyethylene (modified LL), carbon nanotubes (CNT): 73 parts by weight, granular graphite (SG): 159 parts by weight, and carbon fiber (CF): 123 parts by weight were mixed and uniformly kneaded while heating to 140° C. The kneaded blend was passed through a calender roll machine heated to a temperature 1° C. to 5° C. lower than the melting point of the resin to obtain a thickness 20 μm sheet-shaped second conductor part and adhesive resin layer.

Further, a metal sheet (gold-plated stainless steel sheet), adhesive resin layer, first conductor part, and second conductor part were laid in that order. Between the second conductor part and mold, a release type PET film (thickness 25 μm) was sandwiched. From above and below, molds provided with flat plate-shaped and grooved surfaces were used to hot press and bond the entire laminate. The press temperature at this time was set to a temperature 20° C. higher than the melting point of the first resin (PP). The pressure of the press was made 30 MPa. A grooved base part was prepared in this way. The prepared groove parts had a distance between grooves of 350 μm, groove widths of 200 μm, and groove depths of 100 μm. Simultaneously, a metal sheet (gold-plated stainless steel sheet) and adhesive resin layer were laid and hot pressed from above and below using flat plate-shaped molds to join them. The press temperature at this time was set to a temperature 20° C. higher than the melting point of the maleic anhydride-modified low density polyethylene (modified LL). The pressure of the press was made 30 MPa. In this way, a third conductor part provided with a metal sheet was prepared.

The grooved base part and the third conductor part were integrally joined by hot pressing using flat plate-shaped molds from the top and bottom. At the time of hot pressing (hot melt bonding), the temperature was made 130° C. and the press pressure was made 2.4 MPa. As a result, a channel member for fuel cell use of the Structure [I] of FIG. 10(a) was produced (Example 1).

Example 2

Example 2 used a grooved base part and third conductor part the same as the above-mentioned Example 1. At the time of hot pressing the grooved base part and third conductor part, the temperature was made 140° C. and the press pressure was made 2.4 MPa. As a result, a channel member for fuel cell use of the Structure [I] of FIG. 10(a) was produced (Example 2).

Example 3

Example 3 used a grooved base part and third conductor part the same as the above-mentioned Example 1. At the time of hot pressing the grooved base part and third conductor part, the temperature was made 150° C. and the press pressure was made 2.4 MPa. As a result, a channel member for fuel cell use of the Structure [I] of FIG. 10(a) was produced (Example 3).

Example 4

Example 4 used a grooved base part and third conductor part the same as the above-mentioned Example 1. At the time of hot pressing the grooved base part and third conductor part, the temperature was made 140° C. and the press pressure was made 3.1 MPa. As a result, a channel member for fuel cell use of the Structure [I] of FIG. 10(a) was produced (Example 4).

Example 5

Example 5 used a first conductor part and third conductor part the same as the above-mentioned Example 1 and used as the resin of a second conductor part a low density polyethylene (LL). To 100 parts by weight of the low density polyethylene (LL), carbon nanotubes (CNT): 114 parts by weight and granular graphite (SG): 241 parts by weight were mixed and uniformly kneaded while heating to 140° C. The kneaded blend was passed through a calender roll machine heated to a temperature 1° C. to 5° C. lower than the melting point of the resin to obtain a thickness 20 μm sheet-shaped second conductor part.

A metal sheet (gold-plated stainless steel sheet), adhesive resin layer, first conductor part, and second conductor part were laid in that order. From above and below, molds provided with flat plate-shaped and grooved surfaces were used to hot press and bond the entire laminate. The press temperature at this time was set to a temperature 20° C. higher than the melting point of the first resin (PP). The pressure of the press was made 30 MPa. A grooved base part was prepared in this way. Simultaneously, a metal sheet (gold-plated stainless steel sheet) and adhesive resin layer were laid. From above and below, flat plate-shaped molds were used to hot press and bond these. The press temperature at this time was set to a temperature 20° C. higher than the melting point of the maleic anhydride-modified low density polyethylene (modified LL). The pressure of the press was made 30 MPa. A third conductor part provided with a metal sheet was prepared in this way.

The grooved base part and third conductor part were integrally joined by hot pressing using flat plate-shaped molds from the top and bottom. At the time of hot pressing, the temperature was made 145° C. and the press pressure was made 2.4 MPa. As a result, a channel member for fuel cell use of the Structure [I] of FIG. 10(a) was produced (Example 5).

Example 6

In Example 6, the first conductor part and second conductor part were made the same as the above-mentioned Example 1 to prepare a grooved base part. The third conductor part was made a composite of a sheet-shaped article of the first resin containing a carbon material and the third conductor part. The sheet-shaped article of the first resin containing a carbon material was made the same as the first conductor part of Example 1. The third conductor part was made the same as the second conductor part of Example 5. When preparing the composite of the third conductor part, this was passed through a calender roll machine heated to a temperature 1° C. to 5° C. lower than the melting point of the resin to obtain a thickness 20 μm sheet-shaped composite.

The grooved base part and the composite becoming the third conductor part were integrally joined by hot pressing using flat plate-shaped molds from the top and bottom. At the time of hot pressing, the temperature was made 145° C. and the press pressure was made 2.4 MPa. As a result, a channel member for fuel cell use of the Structure [II] of FIG. 10(b) was produced (Example 6).

Example 7

The grooved base part and third conductor part in Example 7 were prepared in the same way as the above-mentioned Example 1. However, the two metal sheets used were changed from gold-plated stainless steel sheets to aluminum foils. That is, the third conductor part of Example 7 was an aluminum foil coated with an adhesive resin layer. At the time of hot pressing the grooved base part and third conductor part, the temperature was made 130° C. and the press pressure was made 2.4 MPa. As a result, a channel member for fuel cell use of the Structure [I] of FIG. 10(a) was prepared (Example 7).

Example 8

The grooved base part and third conductor part in Example 8 were prepared in the same way as the above-mentioned Example 1. However, the metal sheet laid on the grooved part side of the grooved base part was changed from a gold-plated stainless steel sheet to aluminum foil. That is, the third conductor part of Example 8 was also an aluminum foil coated with an adhesive resin layer. At the time of hot pressing the grooved base part and third conductor part, the temperature was made 130° C. and the press pressure was made 2.4 MPa. As a result, a channel member for fuel cell use of the Structure [I] of FIG. 10(a) was prepared (Example 8).

Comparative Example 1

In Comparative Example 1, the grooved base part and third conductor part were made the same as in the above-mentioned Example 1. At the time of hot pressing the grooved base part and third conductor part, the temperature was made 100° C. and the press pressure was made 2.4 MPa. Therefore, while it was attempted to prepare a channel member for fuel cell use of Structure [I] of FIG. 10(a), the two members could not be hot melt bonded (Comparative Example 1).

Comparative Example 2

In Comparative Example 2, the grooved base part and third conductor part were made the same as in the above-mentioned Example 1. At the time of hot pressing the grooved base part and third conductor part, the temperature was made 165° C. and the press pressure was made 2.4 MPa. As a result, a channel member for fuel cell use of the Structure [I] of FIG. 10(a) was produced (Comparative Example 2).

Comparative Example 3

In Comparative Example 3, the grooved base part and third conductor part were made the same as in the above-mentioned Example 1. At the time of hot pressing the grooved base part and third conductor part, the temperature was made 140° C. and the press pressure was made 4.1 MPa. As a result, a channel member for fuel cell use of the Structure [I] of FIG. 10(a) was produced (Comparative Example 3).

Comparative Example 4

In Comparative Example 4, the first conductor part and second conductor part were made the same as in the above-mentioned Example 1 to prepare a grooved base part. Instead of the third conductor part, just a metal sheet (gold plated stainless steel sheet) was used. The grooved base part and the metal sheet were integrally joined by hot pressing using flat plate-shaped molds from the top and bottom. At the time of hot pressing, the temperature was made 140° C. and the press pressure was made 2.5 MPa. As a result, a channel member for fuel cell use of the Structure [III] of FIG. 11(a) was produced (Comparative Example 4).

Comparative Example 5

In Comparative Example 5, the members used were made the same as in Comparative Example 4. At the time of hot pressing, the temperature was made 140° C. and the press pressure was made 3.5 MPa. As a result, a channel member for fuel cell use of the Structure [III] of FIG. 11(a) was produced (Comparative Example 5).

Comparative Example 6

In Comparative Example 6, the first conductor part and second conductor part were made the same as in the above-mentioned Example 1 to prepare a grooved base part. Instead of the third conductor part, just a sheet-shaped article of the first resin was used. This sheet-shaped article of the first resin was made the same as in Example 6. The grooved base part and the sheet-shaped article of the first resin were integrally joined by hot pressing using flat plate-shaped molds from the top and bottom. At the time of hot pressing, the temperature was made 140° C. and the press pressure was made 2.4 MPa. As a result, a channel member for fuel cell use of the Structure [IV] of FIG. 11(b) was produced (Comparative Example 6).

Comparative Example 7

In Comparative Example 7, the members used were made the same as in Comparative Example 6. At the time of hot pressing, the temperature was made 165° C. and the press pressure was made 2.4 MPa. As a result, a channel member for fuel cell use of the Structure [IV] of FIG. 11(b) was produced (Comparative Example 7).

Comparative Example 8

In Comparative Example 8, the second conductor part is omitted from the grooved base part of Example 1. A metal sheet (gold-plated stainless steel sheet), adhesive resin layer, and first conductor part were laid in that order. From above and below, molds provided with flat plate-shaped and grooved surfaces were used to hot press and bond the entire assembly. The press temperature at this time was set to a temperature 20° C. higher than the melting point of the first resin (PP). The pressure of the press was made 30 MPa. A grooved base part without the second conductor part was prepared in this way. Further, to this, a third conductor part provided with a metal sheet the same as Example 1 was joined integrally by hot pressing using flat plate-shaped molds from the top and bottom. At the time of hot pressing, the temperature was made 140° C. and the press pressure was made 2.4 MPa. Therefore, while it was attempted to produce a channel member for fuel cell use of the Structure [V] of FIG. 11(c), the two sides could not be hot melt bonded (Comparative Example 8).

Measurement of Thickness

Channel members for fuel cell use of the examples and comparative examples were measured using a thickness measuring device (made by Toy Seiki Seisaku-sho, B-1) to find their respective thicknesses (μm).

Measurement of Penetration Resistance

Using a resistance meter RM3544 made by Hioki Co., Ltd., a film of a prototype for measurement was gripped from the thickness direction by diameter 30 mm gold-plated plates. It was pressed by 1 MPa and measured for the resistance (mΩ·cm$^2$) in the thickness direction of the film.

Evaluation of Bonding and Shape Retention

Among channel members for fuel cell use prepared as in the examples and comparative examples, examples able to be bonded without extreme deformation of shape were evaluated as "good". Examples where bonding was not possible or where the bonding strength was weak or shape deformation was remarkable were evaluated as "poor".

The corresponding structures (any of [I] to [V]), hot pressing conditions: temperature (° C.) and pressure (MPa), thickness (μm) before and after pressing, penetration resistance (mΩ·cm$^2$) before and after pressing, and the results of evaluation of the bonding and shape (good or poor) are shown in Tables 1 to 3 for the examples and comparative examples.

TABLE 1

| | | Example 1 | Example 2 | Example 3 | Example 4 | Example 5 |
|---|---|---|---|---|---|---|
| Structure | | [I] | [I] | [I] | [I] | [I] |
| Hot press conditions | Temp. (° C.) | 130 | 140 | 150 | 140 | 145 |
| | Pressure (MPa) | 2.4 | 2.4 | 2.4 | 3.1 | 2.4 |
| Thickness (μm) | Before pressing | 414 | 415 | 415 | 420 | 412 |
| | After pressing | 407 | 405 | 403 | 405 | 402 |
| Penetration resistance (mΩ·cm$^2$) | Before pressing | 12.8 | 15.4 | 13.3 | 14.2 | 13.8 |
| | After pressing | 5.3 | 5.9 | 6.0 | 6.1 | 5.8 |
| Evaluation of bonding and shape retention | | Good | Good | Good | Good | Good |

TABLE 2

| | | Example 6 | Example 7 | Example 8 |
|---|---|---|---|---|
| Structure | | [II] | [I] | [I] |
| Hot press conditions | Temp. (° C.) | 145 | 130 | 130 |
| | Pressure (MPa) | 2.4 | 2.4 | 2.4 |
| Thickness (μm) | Before pressing | 379 | 216 | 313 |
| | After pressing | 379 | 207 | 304 |
| Penetration resistance | Before pressing | 12.8 | 562 | 242 |

TABLE 2-continued

| | | Example 6 | Example 7 | Example 8 |
|---|---|---|---|---|
| (mΩ·cm$^2$) | After pressing | 11.5 | 97 | 97 |
| Evaluation of bonding and shape retention | | Good | Good | Good |

TABLE 3

| | | Comparative Example 1 | Comparative Example 2 | Comparative Example 3 | Comparative Example 4 |
|---|---|---|---|---|---|
| Structure | | [I] | [I] | [I] | [III] |
| Hot press conditions | Temp. (° C.) | 100 | 165 | 140 | 140 |
| | Pressure (MPa) | 2.4 | 2.4 | 4.1 | 2.5 |
| Thickness (μm) | Before pressing | 415 | 414 | 420 | 396 |
| | After pressing | — | 377 | 359 | 385 |
| Penetration resistance (mΩ·cm$^2$) | Before pressing | 15.4 | 13.7 | 13.7 | 4.8 |
| | After pressing | — | 5.8 | 9.9 | 6.0 |
| Evaluation of bonding and shape retention | | Poor | Poor | Poor | Poor |

TABLE 4

| | | Comparative Example 5 | Comparative Example 6 | Comparative Example 7 | Comparative Example 8 |
|---|---|---|---|---|---|
| Structure | | [III] | [IV] | [IV] | [V] |
| Hot press conditions | Temp. (° C.) | 140 | 140 | 165 | 140 |
| | Pressure (MPa) | 3.5 | 2.4 | 2.4 | 2.4 |
| Thickness (μm) | Before pressing | 396 | 373 | 360 | 600 |
| | After pressing | 373 | 364 | 337 | 586 |
| Penetration resistance (mΩ·cm$^2$) | Before pressing | 4.8 | 19.9 | 19.9 | 18.5 |
| | After pressing | 6.7 | 15.5 | 12.5 | — |
| Evaluation of bonding and shape retention | | Poor | Poor | Poor | Poor |

Findings and Considerations

The channel members for fuel cell use of the examples were all evaluated as good in bonding. Further, the conductivities were confirmed from the values of the penetration resistances even after hot melt bonding along with hot pressing of the members. In addition, the examples changed in types of metal sheets as well could also be evaluated as good in bonding. The difference in the value of the penetration resistance can be considered to be the resistance of the metal sheet itself. Comparative Example 1 was low in temperature at the time of hot pressing and was insufficient in hot melt bonding of the resin, so was poor in bonding. Comparative Example 2 was high in temperature at the time of hot pressing. The resin of the grooved base part for forming the channels also softened and ended up changing in shape. Comparative Example 3 was high in pressure at the time of hot pressing and remarkably deformed in shape, so was poor.

In Comparative Example 4, the grooved base part had a second conductor part. Only a metal sheet was laid on this.

Due to this, it was learned that the bonding is not sufficient with only melt bonding of the resin of the second conductor part. Comparative Example 5 had a pressure at the time of hot pressing further higher than even Comparative Example 4, but sufficient bonding could not be obtained.

Comparative Example 6 is a sheet-shaped article of a first resin having a second conductor part at the grooved base part and containing a carbon material in this. Even if what was laid was a resin, it was learned that the bonding is not sufficient with only melt bonding of the resin of the second conductor part. Comparative Example 7 had a pressure at the time of hot pressing further higher than even Comparative Example 6, but sufficient bonding could not be obtained. Comparative Example 8 is an example of a grooved base part omitting the second conductor part and has a metal sheet bonded to this. A sufficient bonding could not be obtained even if providing an adhesive resin layer at the metal sheet side.

From the comparison of the examples evaluated as good in bonding and shape and the comparative examples evaluated as poor in results, it can be said that mainly the following points are necessary when producing a channel member for fuel cell use. First, when laying another resin member on the grooved base part forming the main body part of the channels so as to cover it, a resin hot melt bonding the side of the grooved base part and the third conductor part forming the cover is necessary. Second, at the time of hot melt bonding, the resin of the grooved base part (groove parts) is kept from melting and deforming along with heating, so it is necessary to employ a resin with a higher melting point than the hot melt bonding temperature for the resin of the main body part of the grooved base part. Third, the temperature at the time of the final hot pressing has to be made a temperature lower than the melting point of the resin of the main body part of the grooved base part and higher than the melting point of the resin contributing to bonding between the members. If considering these points, it is possible to suppress unintentional deformation of shape of members and possible to form good channels inside. Furthermore, good bondability was exhibited by hot melt bonding even if interposing a metal sheet in the members. Therefore, the channel member for fuel cell use can be said to be extremely high in convenience as a member built into a fuel cell. Industrial Applicability If using the method of production of a channel member for fuel cell use of the present invention, it is possible produce a member formed with fine channels extremely simply and inexpensively by selection of the members and differences in melting points. Therefore, this is promising as a member suitable for circulation of the hydrogen, oxygen, and other fuel, the cooling medium, and other various fluids supplied to the inside of a fuel cell. Of course, it is also possible to use this for various applications requiring the characteristics of the present invention other than this.

REFERENCE SIGN LIST 1. resin
2. carbon nanotubes
3. granular graphite
4. carbon fiber
10A, 10B, 10C, 10D, 10E, 10F. channel member for fuel cell use
11. first conductor part
13. base part
15, 15d, 15e, 17, 17d. groove part
16, 16b, 16c, 16d, 16e, 16f, 16g, 16h, 16x, 16y. grooved base part
18. fluid channel
19. ridge part
21. second conductor part
31. third conductor part
40. metal sheet
45. adhesive resin layer
50. mold
51. grooved surface
Su. relief-shaped groove part

The invention claimed is:

1. A method of production of a channel member for fuel cell use comprising:
   a step of obtaining at least two sheet-shaped first conductor parts, each containing a first resin and a carbon material,
   a step of laying a sheet-shaped second conductor part containing a second resin with a lower melting point than said first resin and a carbon material on at least one surface of each said sheet-shaped first conductor part to form at least a first sheet-shaped base part and a second sheet-shaped base part,
   a step of transferring a grooved surface to at least one surface of each of said first sheet-shaped base part and said second sheet-shaped base part to form a first grooved base part provided with groove parts and a second grooved base part provided with groove parts,
   a step of laying a side of the second grooved base part on a side of said first grooved base part where said groove parts of the first grooved base part are formed, and
   a step of integrally joining said first grooved base part and said second grooved base part by hot melt bonding to cover said groove parts of the first grooved base part.

2. The method of production of a channel member for fuel cell use according to claim 1, wherein said groove parts of the first grooved base part are provided at the surface of said first grooved base part where said second conductor part is laid.

3. The method of production of a channel member for fuel cell use according to claim 1, wherein said groove parts of the first grooved based part are provided at two surfaces of said first grooved base part.

4. The method of production of a channel member for fuel cell use according to claim 1, wherein the first grooved base part comprises only one second conductor part, and said groove parts of the first grooved base part are provided at a surface of the first grooved base part that is opposite to a side where said second conductor part is laid.

5. The method of production of a channel member for fuel cell use according to claim 1, wherein said groove parts of the second grooved base part are provided at the surface of said second grooved base part that faces the first grooved based part.

6. The method of production of a channel member for fuel cell use according to claim 1, wherein said groove parts are relief-shaped groove parts.

7. The method of production of a channel member for fuel cell use according to claim 6, wherein said relief-shaped groove parts are consecutive parallel structures of groove parts and ridge parts.

8. The method of production of a channel member for fuel cell use according to claim 6, wherein groove depths of said relief-shaped groove parts are 50 to 200 μm and groove widths of said relief-shaped groove parts are 100 to 400 μm.

9. The method of production of a channel member for fuel cell use according to claim 1, wherein at least one of said first grooved base part and said second grooved base part is provided with a metal sheet.

10. The method of production of a channel member for fuel cell use according to claim 9, wherein said metal sheet is provided with an adhesive resin layer containing a carbon material.

11. The method of production of a channel member for fuel cell use according to claim 1, wherein each of said carbon materials is at least one type of carbon nanotubes, granular graphite, or carbon fibers.

12. The method of production of a channel member for fuel cell use according to claim 10, wherein said carbon material of the adhesive resin layer is at least one type of carbon nanotubes, granular graphite, or carbon fibers.

13. The method of production of a channel member for fuel cell use according to claim 3, wherein said second conductor part of said first grooved base part contacts said second conductor part of said second grooved base part.

14. The method of production of a channel member for fuel cell use according to claim 13, wherein said groove parts of the second grooved base part are provided at a surface of the second grooved base part that is opposite to a side where said second conductor part is laid.

15. The method of production of a channel member for fuel cell use according to claim 13, wherein said groove parts of the second grooved base part are provided at the surface of said second grooved base part where said second conductor part is laid.

16. The method of production of a channel member for fuel cell use according to claim 15, wherein, in forming the first sheet-shaped base part, a sheet-shaped second conductor part is laid on two surfaces of the corresponding sheet-shaped first conductor part.

17. The method of production of a channel member for fuel cell use according to claim 5, wherein, in forming the first sheet-shaped base part, a sheet-shaped second conductor part is laid on two surfaces of the corresponding sheet-shaped first conductor part.

18. The method of production of a channel member for fuel cell use according to claim 10, wherein the adhesive resin comprises an acid modified polyolefin resin having a lower melting point than said first resin.

* * * * *